US012463376B2

(12) United States Patent
Hamaguchi et al.

(10) Patent No.: US 12,463,376 B2
(45) Date of Patent: Nov. 4, 2025

(54) SEALING MEMBER AND WATERPROOF CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takaaki Hamaguchi, Mie (JP); Yusaku Maeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 424 days.

(21) Appl. No.: 17/915,259

(22) PCT Filed: Mar. 10, 2021

(86) PCT No.: PCT/JP2021/009485
§ 371 (c)(1),
(2) Date: Sep. 28, 2022

(87) PCT Pub. No.: WO2021/199988
PCT Pub. Date: Oct. 7, 2021

(65) Prior Publication Data
US 2023/0133679 A1 May 4, 2023

(30) Foreign Application Priority Data
Mar. 31, 2020 (JP) ................................ 2020-061740

(51) Int. Cl.
*H01R 13/52* (2006.01)
*C09K 3/10* (2006.01)

(52) U.S. Cl.
CPC ....... *H01R 13/5216* (2013.01); *C09K 3/1018* (2013.01); *H01R 13/5219* (2013.01); *H01R 13/5221* (2013.01); *C09K 2200/0685* (2013.01)

(58) Field of Classification Search
CPC ................................................. H01R 13/5216
See application file for complete search history.

(56) References Cited

U.S. PATENT DOCUMENTS 6,071,146 A * 6/2000 Horner .............. H01R 13/5208
439/275
9,994,747 B2 * 6/2018 Ooki .................. C09K 3/1018
(Continued)

FOREIGN PATENT DOCUMENTS

JP H06-092056 A 4/1994
JP 2007-320277 A 12/2007
(Continued)

OTHER PUBLICATIONS

Mykin Inc. RS00170 Silicone Compound https://mykin.com/silicone-properties (Year: 2024).*
(Continued)

*Primary Examiner* — Vanessa Girardi
(74) *Attorney, Agent, or Firm* — Venjuris, P.C.

(57) ABSTRACT

The present disclosure provides a sealing member that includes insertion holes into which connector terminals are inserted, wherein the sealing member exhibits a high water sealability and damage caused when the connector terminal is inserted into the insertion hole is suppressed. The present disclosure also provides a waterproof connector that includes the sealing member. A sealing member 10 includes: a silicone rubber that is formed as a plate-like member; and
(Continued)

insertion holes 11 that are formed in a plate surface of the plate-like member and into which connector terminals 20 can be inserted. The silicone rubber has an unnotched Charpy impact strength at −60° C. of 11.5 $kJ/m^2$ or more. A waterproof connector 1 includes the sealing member 10 and the connector terminals 20. The connector terminals 20 are inserted into the insertion holes 11 of the sealing member 10.

6 Claims, 1 Drawing Sheet

(56) References Cited

U.S. PATENT DOCUMENTS

2016/0372853 A1* 12/2016 Kono .................. H01R 13/405
2017/0145272 A1 5/2017 Ooki
2020/0024404 A1 1/2020 Hamaguchi
2023/0133679 A1* 5/2023 Hamaguchi .............. C09K 3/10
439/271

FOREIGN PATENT DOCUMENTS

JP 2008-208250 A 9/2008
JP 2016058138 * 4/2016 ............. H01R 13/52
JP 2018159020 * 10/2018 ............. H01R 13/52

OTHER PUBLICATIONS

MatWeb Material Property Data (Search, Silicone Rubber) Overview of materials for Silicone Rubber https://www.matweb.com/search/QuickText.aspx?SearchText=silicone%20rubber (Year: 1996).*
Shin-Etsu Silicone—Characteristic Properties of Silicone Rubber Compounds https://www.shinetsusilicones.com/Literature (Year: 2020).*
International Search Report issued on May 25, 2021 for WO 2021/199988 A1 (4 pages).

* cited by examiner

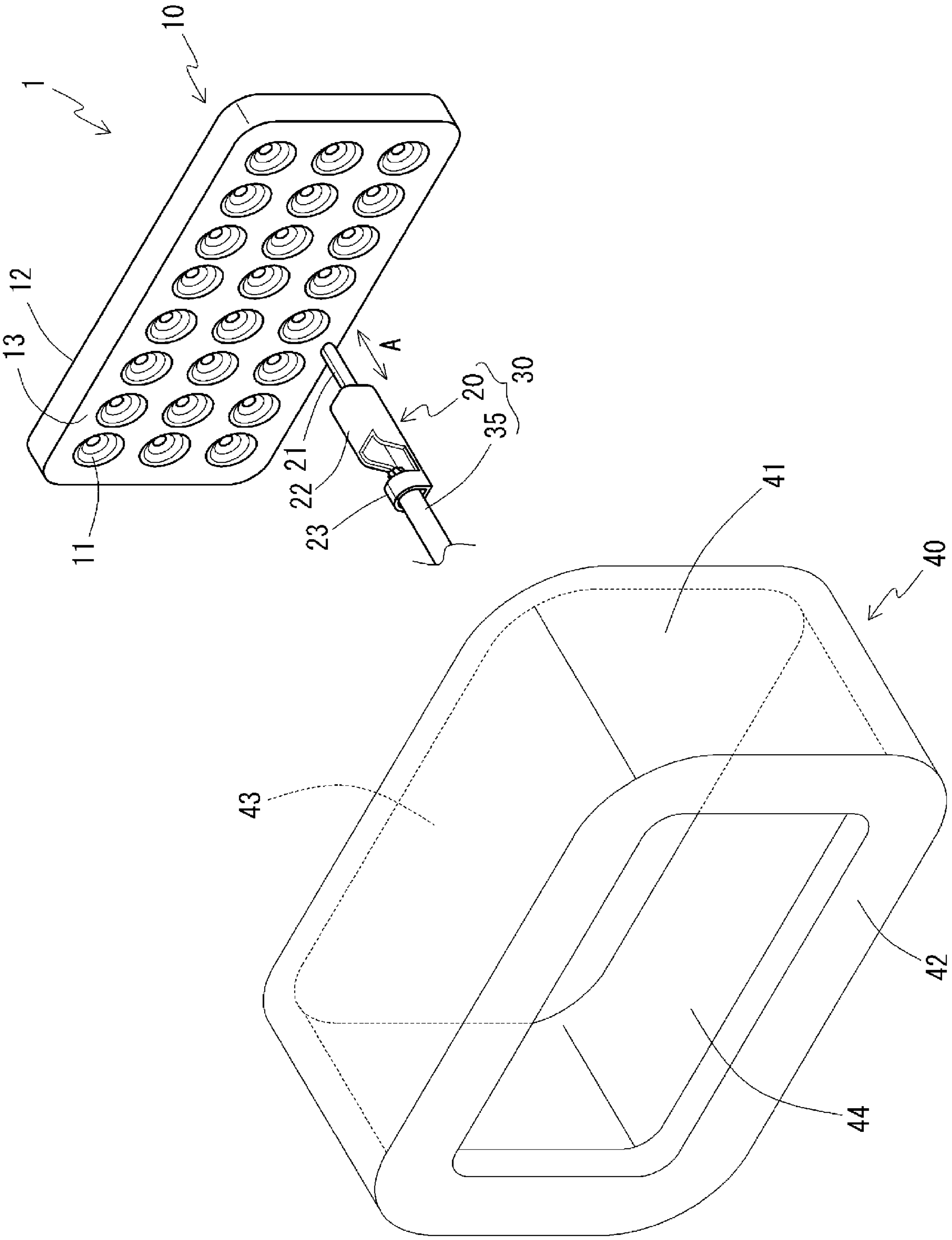
1
10
12
13
11
A
20
30
35
21
22
23
41
40
43
42
44

SEALING MEMBER AND WATERPROOF CONNECTOR

CROSS REFERENCE TO RELATED APPLICATIONS

This application is a national phase of PCT application No. PCT/JP2021/009485, filed on 10 Mar. 2021, which claims priority from Japanese patent application No. 2020-061740, filed on 31 Mar. 2020, all of which are incorporated herein by reference.

TECHNICAL FIELD

The present disclosure relates to a sealing member and a waterproof connector.

BACKGROUND

A sealing member may be used in a connector used to establish an electrical connection with an electrical component within a vehicle such as an automobile, in order to suppress intrusion of water into the connector. The sealing member is configured as a molded body made of rubber or the like, and includes insertion holes into which connector terminals can be inserted. A waterproof connector is configured by inserting terminal-equipped electric wires, each configured by connecting a connector terminal to a terminal end of an electric wire, into the insertion holes of the sealing member that is housed in a connector housing.

Recent years have seen an increase in the number of electrical components mounted in a vehicle such as an automobile, and thus miniaturization of electrical components and integration of connection points are required. For the integration of connection points, it is effective to house a large number of connector terminals in one connector. As a sealing member used in a waterproof connector that houses a large number of connector terminals, a sealing member in which a large number of insertion holes are arranged in a matrix is used. For example, Patent Document 1 discloses a sealing member that includes a large number of insertion holes, and a waterproof connector that includes the sealing member.

PRIOR ART DOCUMENT

Patent Document

Patent Document 1: JP 2018-159020 A
Patent Document 2: JP 2016-058138 A

SUMMARY OF THE INVENTION

Problems to be Solved

In a sealing member used in a waterproof connector, a tear may occur in the sealing member when a connector terminal is inserted into an insertion hole. As a result, the sealing member may not be able to sufficiently suppress the intrusion of water into the connector. The intrusion of water may affect the electrical connection realized by the connector terminals.

In particular, as disclosed in Patent Document 1, if a tear occurs in the sealing member that includes a large number of insertion holes, the intrusion of water may affect the entire connector that includes a large number of connector terminals. In recent years, accompanying the integration of connection points and the miniaturization of electrical components, the trend is to increase the arrangement density of insertion holes in a sealing member and to reduce the diameter of insertion holes. With the increased density of insertion holes and the reduction in the diameter of insertion holes, a tear is even more likely to occur in the sealing member.

In Patent Document 1, a tear that occurs in the sealing member is suppressed by configuring the sealing member using a thermosetting silicone rubber that contains three units, each having a predetermined chemical structure, in a molecule. From the viewpoint of avoiding damage to the rubber-like material such as silicone rubber caused by deformation of the sealing member, elasticity and viscoelasticity can be given as typical examples of physical properties used as indicators for selecting a material. Patent Document 1 also gives consideration to the modulus at break of the thermosetting silicone rubber from the viewpoint of suppressing the occurrence of tears in the insertion holes.

However, according to studies conducted by the inventors of the present application, using only elasticity and viscoelasticity may not allow for sufficient evaluation of the probability of the occurrence of damage such as a tear caused when a terminal is inserted into an insertion hole of a sealing member used in a waterproof connector. For example, in the case where the values of parameters related to elasticity and viscoelasticity do not exhibit a clear correlation with the probability of occurrence of damage, even when there is no large difference in the values of the parameters between different materials, a large difference may occur in the probability of occurrence of damage. Therefore, there is room for improvement in producing a sealing member that is unlikely to be damaged when a connector terminal is inserted into an insertion hole of the sealing member by finding another parameter that can be used as an indicator that sensitively reflects the probability of the occurrence of damage when a terminal is inserted into an insertion hole, and selecting a material using the parameter as an indicator.

Accordingly, it is an object of the present disclosure to provide a sealing member that includes an insertion hole into which a connector terminal is to be inserted, wherein the sealing member exhibits a high water sealability and damage caused when the connector terminal is inserted into the insertion hole is suppressed.

Means to Solve the Problem

A sealing member according to the present disclosure includes: a silicone rubber that is formed as a plate-like member; and an insertion hole that is formed in a plate surface of the plate-like member and into which a connector terminal can be inserted, wherein the silicone rubber has an unnotched Charpy impact strength at −60° C. of 11.5 $kJ/m^2$ or more.

A waterproof connector according to the present disclosure includes: the sealing member described above; and a connector terminal, wherein the connector terminal is inserted into the insertion hole of the sealing member.

Effect of the Invention

The sealing member according to the present disclosure is a sealing member that includes an insertion hole into which a connector terminal is to be inserted, wherein the sealing member exhibits a high water sealability and damage caused when the connector terminal is inserted into the insertion hole is suppressed. Also, the waterproof connector according to the present disclosure is a waterproof connector that includes the sealing member.

BRIEF DESCRIPTION OF THE DRAWINGS

FIG. 1 is an exploded perspective view showing a configuration of a waterproof connector according to an embodiment of the present disclosure. The diagram shows a connector terminal and a connector housing together with a sealing member according to an embodiment of the present disclosure.

DETAILED DESCRIPTION TO EXECUTE THE INVENTION

Description of Embodiment of the Present Disclosure

First, aspects of an embodiment according to the present disclosure will be listed and described.

A sealing member according to the present disclosure includes: a silicone rubber that is formed as a plate-like member; and an insertion hole that is formed in a plate surface of the plate-like member and into which a connector terminal can be inserted, wherein the silicone rubber has an unnotched Charpy impact strength at −60° C. of 11.5 kJ/m$^2$ or more.

In the silicone rubber that constitutes the sealing member, the unnotched Charpy impact strength at a low temperature of −60° C. is set to a lower limit of 11.5 kJ/m$^2$ or more. As a result of the silicone rubber having such a high Charpy impact strength, the silicone rubber has a high level of impact resistance. Accordingly, damage such as a tear is unlikely to occur even when an impact is applied to the sealing member due to contact of the connector terminal when the connector terminal is inserted into the insertion hole of the sealing member. The silicone rubber is a flexible material, and thus there is no large difference in Charpy impact strength at room temperature. However, by evaluating Charpy impact strength at a low temperature of −60° C., the probability of occurrence of damage when the connector terminal is inserted into the insertion hole can be sensitively evaluated. Accordingly, by configuring a sealing member using a silicone rubber that has a Charpy impact strength at −60° C. greater than or equal to a predetermined lower limit, damage caused when the connector terminal is inserted into the insertion hole can be suppressed, and a high water sealability can be ensured.

Here, the silicone rubber may have a loss tangent tan δ at room temperature of 0.10 or less. By evaluating the silicone rubber that constitutes the sealing member using, as indicators, loss tangent tan δ at a low temperature in addition to Charpy impact strength at a low temperature, it is possible to more appropriately select a material that can suppress the occurrence of damage when the connector terminal is inserted into the insertion hole of the sealing member. As long as the loss tangent tan δ is set to 0.10 or less, the silicone rubber can significantly exhibit elasticity, and thus deformation that leads to the occurrence of damage such as a tear when the connector terminal is inserted into the insertion hole is unlikely to occur.

The insertion hole may include a plurality of insertion holes. A sealing member that includes a plurality of insertion holes can be easily designed by arranging insertion holes at a high density in the sealing member and reducing the diameter of each insertion hole. Accordingly, damage to the sealing member and a reduction in the water sealability of the sealing member are more likely to occur as compared with a sealing member that includes only one insertion hole. Also, damage to one of the insertion holes of the sealing member is likely to affect the entire sealing member and the entire waterproof connector that includes the sealing member. However, as a result of the silicone rubber that constitutes the sealing member having the above-described predetermined properties, even when the sealing member includes a plurality of insertion holes, it is possible to effectively suppress the occurrence of damage to the sealing member and ensure a high water sealability.

A hole area ratio r that is evaluated as r=Sh/S0 may be 0.2 or more, where S0 represents an area of the plate surface of the plate-like member, and Sh represents a total area of the insertion hole in the plate surface of the plate-like member. When the hole area ratio r is large, the insertion holes are disposed at a high density in the sealing member, and thus a load is likely to be applied to various portions of the sealing member, and thus damage to the sealing member and a reduction in the water sealability of the sealing member are likely to occur when connector terminals are inserted into the insertion holes. However, as a result of the silicone rubber that constitutes the sealing member having the above-described predetermined physical properties, it is possible to effectively suppress the occurrence of damage to the sealing member and ensure a high water sealability.

A waterproof connector according to the present disclosure includes the sealing member described above and a connector terminal. The connector terminal is inserted into the insertion hole of the sealing member.

As described above, in this waterproof connector, the sealing member has a Charpy impact strength at a low temperature greater than or equal to a predetermined lower limit, and it is therefore possible to suppress the occurrence of damage such as a tear when the connector terminal is inserted into the insertion hole. As a result, the waterproof connector has excellent water-sealing performance.

Here, the connector terminal may be connected to a terminal end of an electric wire, and an inner circumferential surface of the insertion hole of the sealing member may be in contact with a surface of the electric wire. When the connector terminal connected to a terminal end of an electric wire is inserted into the insertion hole of the sealing member so as to be passed therethrough, the occurrence of damage such as a tear to the sealing member is suppressed, and thus the surface of the electric wire can come into close contact with the inner circumferential surface of the tear-free insertion hole. As a result, a high water sealability is ensured between the sealing member and the electric wire.

Detailed Description of Embodiment of the Present Disclosure

Hereinafter, a sealing member and a waterproof connector according to an embodiment of the present disclosure will be described in detail with reference to the accompanying drawings. The sealing member according to the embodiment of the present disclosure is made of a silicon rubber that has predetermined properties. The waterproof connector according to the embodiment of the present disclosure includes the sealing member according to the embodiment of the present disclosure.

<Waterproof Connector>

The waterproof connector according to an embodiment of the present disclosure will be described first. FIG. 1 is an exploded perspective view of a waterproof connector 1 according to an embodiment of the present disclosure.

The waterproof connector 1 includes a sealing member 10 according to an embodiment of the present disclosure. The waterproof connector 1 further includes: terminal-equipped electric wires 30, each equipped with a connector terminal 20 (hereinafter also referred to simply as "terminal"); and a connector housing 40 (hereinafter also referred to as simply "housing").

Although a detailed description of the sealing member 10 will be given later, the sealing member 10 is configured as a plate-like member, and includes, on a plate surface of the sealing member 10, insertion holes 11 into which the terminals 20 can be inserted. The sealing member 10 may include only one insertion hole 11 or a plurality of insertion holes 11. However, it is preferable to use a configuration in which a plurality of insertion holes 11 are arranged in a matrix in the longitudinal direction and the transverse direction of the sealing member 10 on the plate surface of the sealing member 10. There is no particular limitation on the outer shape of the sealing member 10. However, in this example, the sealing member 10 is formed as a rectangular plate-like member with rounded corners.

The terminals 20 are inserted into the plurality of insertion holes 11 of the sealing member 10 in one-to-one correspondence. The terminals 20 are inserted into all of the plurality of insertion holes 11 of the sealing member 10. However, for the sake of simplification of the drawing, only one terminal 20 is shown in FIG. 1.

In the waterproof connector 1, each terminal 20 that is inserted into an insertion hole 11 of the sealing member 10 is connected to a terminal end of an electric wire 35, thereby forming a terminal-equipped electric wire 30. The terminal 20 includes, from the leading end side of the terminal 20, an electrical connection portion 21, a tubular portion 22, and a crimping portion 23 that are continuously formed into a unitary body in the lengthwise direction of the terminal 20. The electrical connection portion 21 is a portion that is electrically connected to a mating terminal (not shown). The crimping portion 23 is a portion that fixes the electric wire 35 through crimping. The tubular portion 22 connects the electrical connection portion 21 and the crimping portion 23.

Each terminal-equipped electric wire 30 is inserted into an insertion hole 11 by inserting the leading end of the electrical connection portion 21 of the terminal 20 into the insertion hole 11 from a rear surface 13 side to a front surface 12 side of the sealing member 10 along an insertion axis A that is parallel to the thickness direction of the sealing member 10. The terminal-equipped electric wire 30 is inserted such that the entire area of the terminal 20 in the lengthwise direction of the terminal 20 is passed through the insertion hole 11. That is, in the waterproof connector 1, the terminal-equipped electric wire 30 is inserted such that a portion of the electric wire 35 connected to the terminal 20 is disposed in the insertion hole 11 and the outer circumferential surface of the portion of the electric wire 35 is surrounded by the inner circumferential surface of the insertion hole 11.

In the waterproof connector 1, the sealing member 10 is housed in the housing 40. The housing 40 is made of a material that is harder than the sealing member 10, and integrally includes a side wall 41 that has a rectangular tubular shape and a rear wall 42 that is provided at one end of the side wall 41. At the other end of the side wall 41, no wall is formed and thus an opening 43 is formed. The outer shape of the rear wall 42 is preferably formed to be smaller than the plate surface of the sealing member 10. Also, a window 44 is formed in the rear wall 42 as a region that is not closed off by the constituent material of the housing 40. The position and the size of the window 44 are set such that all of the insertion holes 11 fall within the window 44 when the sealing member 10 is housed in the housing 40 and brought into close contact with the rear wall 42.

In the waterproof connector 1, the sealing member 10 is housed in the housing 40 from the opening 43, and the rear surface 13 of the sealing member 10 is brought into contact with the rear wall 42 of the housing 40. The outer shape of the rear wall 42 of the housing 40 is formed to be smaller than the outer shape of the sealing member 10, and thus the sealing member 10 is housed in the housing 40 in a compressed state. The group of insertion holes 11 formed in the sealing member 10 face the outside space via the window 44 of the housing 40.

Furthermore, a terminal-equipped electric wire 30 is inserted into each of the insertion holes 11 of the sealing member 10 that is housed in the housing 40. At this time, the terminal 20 of the terminal-equipped electric wire 30 is inserted into the insertion hole 11 from the rear surface 13 of the sealing member 10 via the window 44. As described above, the terminal 20 is passed through the insertion hole 11 such that the electric wire 35 is disposed in the insertion hole 11. Although not shown in the diagram, the waterproof connector 1 further includes an inner housing that is disposed in the housing 40 and includes a terminal housing chamber in which the terminal 20 can be housed. The terminal 20 that has been passed through the insertion hole 11 of the sealing member 10 is housed in the terminal housing chamber of the inner housing. The waterproof connector 1 is mated with a mating connector (not shown) in the opening 43 of the housing 40, and the terminal 20 housed in the housing 40 is mated with a mating terminal at the electrical connection portion 21.

In the waterproof connector 1, the sealing member 10 functions to suppress the intrusion of water (or any other liquid, the same applies hereinafter) into a space surrounded by the housing 40 from the outside. Specifically, by bringing the inner circumferential surface of each insertion hole 11 of the sealing member 10 into close contact with the outer circumferential surface of the electric wire 35 inserted as a terminal-equipped electric wire 30, it is possible to suppress the intrusion of water into the housing 40 from the periphery of the terminal-equipped electric wire 30. In addition, by bringing the rear surface 13 of the sealing member 10 into close contact with the rear wall 42 of the housing 40, it is possible to suppress the intrusion of water from the outside of the walls of the housing 40, in particular, the intrusion of water from the window 44 of the rear wall 42.

<Sealing Member>

Next, the sealing member 10 according to the embodiment of the present disclosure will be described in detail. As described above, the sealing member 10 is configured as a plate-like member that includes the front surface 12 and the rear surface 13 that are parallel to each other, and includes insertion holes 11 extending through the front surface 12 and the rear surface 13 along the insertion axis A that is parallel to the thickness direction of the sealing member 10.

(Constituent Material of Sealing Member)

The sealing member 10 is made of a silicone rubber that has predetermined properties. The silicone rubber exhibits not only high water sealability and elasticity, but also excellent levels of mechanical strength, thermal stability, and chemical stability, and is therefore suitable for configuring a waterproof sealing member. As the silicone rubber, it is preferable to use an addition reaction type silicone rubber that has a thermosetting property. The addition reaction type silicone rubber contains an alkenyl group-containing organo-polysiloxane as a main component and a hydrosilyl group-containing organo-polysiloxane as a curing agent, and the molecular chains thereof are crosslinked by a platinum catalyst. Examples of the alkenyl group include a vinyl group, an allyl group, a butenyl group, a pentenyl group, and the like. An organo-polysiloxane contains a polysiloxane chain (—Si—O—Si—O—) as a main chain and an organic group on a Si atom of the main chain. Examples of the organic group of the organo-polysiloxane include a methyl group, an ethyl group, a phenyl group, and the like. The silicone rubber may optionally contain secondary components such as silicone oil and components other than silicone that is used as the main component such as an additive and a filler.

In the present embodiment, as the properties required for the silicone rubber constituting the sealing member 10, Charpy impact strength at a low temperature is defined. Specifically, the silicone rubber has a Charpy impact strength at −60° C. (hereinafter also referred to as "low-temperature Charpy impact strength") of 11.5 $kJ/m^2$ or more. As used herein, the term "Charpy impact strength" refers to a value evaluated based on an unnotched Charpy impact test. As the Charpy impact test, a test specified in JIS K7111-1:2012 can be used. The nominal pendulum energy may be set to, for example, 1.00 J.

The silicone rubber that constitutes the sealing member 10 is configured to have a low-temperature Charpy impact strength of 11.5 $kJ/m^2$ or more, and thus the silicone rubber exhibits a high level of impact resistance and excellent toughness. As a result, when the terminal 20 is inserted into the insertion hole 11 of the sealing member 10, damage such as a tear is unlikely to occur in the inner circumferential surface of the insertion hole 11 of the sealing member 10. When the silicone rubber has a low-temperature Charpy impact strength of 11.5 $kJ/m^2$ or more, the occurrence of damage when the terminal 20 is inserted into the insertion hole 11 can be more effectively suppressed. There is no particular limitation on the upper limit of the low-temperature Charpy impact strength, and the higher the low-temperature Charpy impact strength, the more preferable.

The Charpy impact strength can be used as an indicator indicating the degree to which a material can withstand an impact caused by contact when the material is brought into contact with another object, and is highly correlated with the probability of occurrence of damage such as a tear to the inner circumferential surface of the insertion hole 11 when the terminal 20 is inserted into the insertion hole 11 of the sealing member 10. That is, when the value of the Charpy impact strength is sufficiently high, in the process of inserting the terminal 20 into the insertion hole 11 of the sealing member 10, the sealing member 10 is unlikely to be damaged due to the impact applied to the sealing member 10 by the terminal 20 when the terminal 20 is brought into contact with the sealing member 10. The silicone rubber is very flexible at room temperature, and it is therefore difficult to accurately evaluate the Charpy impact strength at room temperature, and in addition thereto, a difference is unlikely to occur in the Charpy impact strength between materials. Accordingly, the Charpy impact strength at room temperature cannot be used as a parameter that sensitively reflects the probability of occurrence of damage when the terminal is inserted into the insertion hole. However, when the Charpy impact strength is evaluated after the silicone rubber has been cooled to a low temperature of −60° C. to increase the degree of hardness of the silicone rubber, due to the difference in toughness of materials, a large difference occurs in the value of the Charpy impact strength, and thus the Charpy impact strength can be used as a parameter that sensitively reflects the probability of occurrence of damage when a terminal is inserted into an insertion hole.

For a rubber-like material such as a silicone rubber, it is often the case that parameters related to elasticity and viscoelasticity are used as indicators for evaluating the probability of occurrence of damage when it is deformed. These parameters can clearly reflect the behavior of deformation of the material that undergoes elastic deformation, but it is not possible to directly evaluate the behavior of contact with another object such as collision. In the sealing member 10, when the terminal 20 is inserted into the insertion hole 11, a phenomenon occurs in which the terminal 20 that moves along the insertion axis A comes into contact and collides with the sealing member 10. Particularly in the case where the inner circumferential surface of the insertion hole 11 has irregularities, the terminal 20 is likely to collide with bumps that are formed by the inner circumferential surface being raised toward the inside of the insertion hole 11 at points where the inner diameter of the insertion hole 11 is small. Due to the contact phenomenon, damage such as a tear may occur in the sealing member 10. Using only the elasticity and the viscoelasticity of the silicone rubber may not allow for sufficient evaluation of a load applied due to contact with another object as described above and the occurrence of damage caused by the application of a load, but by using the Charpy impact strength for evaluating impact resistance through collision, it is possible to appropriately evaluate them. Accordingly, in the sealing member 10, the Charpy impact strength is highly correlated with the probability of occurrence of damage when the terminal 20 is inserted into the insertion hole 11. When the value of the low-temperature Charpy impact strength is sufficiently high, the occurrence of damage when the terminal is inserted into the insertion hole can be suppressed.

Damage such as a tear due to contact by the terminal 20 is unlikely to occur in the sealing member 10 while the terminal 20 is being passed through the insertion hole 11, and thus, in a state in which the terminal 20 has been passed through the insertion hole 11, and the electric wire 35 of the terminal-equipped electric wire 30 is disposed in the insertion hole 11, the inner circumferential surface of the insertion hole 11 without damage such as a tear is in contact with the surface of the electric wire 35. As a result, the inner circumferential surface of the insertion hole 11 and the surface of the electric wire 35 are in very close contact with each other. Due to the close contact and the absence of damage such as a tear that may serve as a water intrusion path in the inner circumferential surface of the insertion hole 11, a high water sealability of the sealing member 10 is maintained. Accordingly, in the waterproof connector 1, it is possible to suppress, to a high degree, a situation from occurring in which water intrudes into the housing 40 from an area between the insertion hole 11 and the terminal-equipped electric wire 30. The low-temperature Charpy impact strength of the silicone rubber can be controlled by adjusting, for example, the crosslink density and the chain length of a silicone molecular chain, the addition amount of secondary components such as silicone oil, the addition amount of a filler, and the like.

As described above, in the case where a parameter related to the viscoelasticity of the silicone rubber is used alone, it may not be possible to sensitively evaluate the probability of occurrence of damage when the terminal 20 comes into contact with the sealing member 10, but by using the viscoelasticity together with the low-temperature Charpy impact strength, the viscoelasticity can be an indicator for suppressing the occurrence of damage to the sealing member 10 to an even higher degree. Specifically, the silicone rubber may have a loss tangent tan δ of 0.10 or less, or 0.05 or less. The viscoelasticity of a material is expressed by storage elastic modulus E' and loss elastic modulus E", and tan δ=E"/E'. The loss tangent tan δ can be evaluated based on dynamic viscoelasticity measurement. The measurement frequency may be set to, for example, 1 Hz. The evaluation temperature may be set to room temperature (approximately 15 to 25° C.).

The smaller the loss tangent tan δ of a material, the more strongly the material behaves as an elastic body rather than a viscous body. In the sealing member 10, the smaller the loss tangent tan δ, the more likely the sealing member 10 is to elastically restores even when the sealing member 10 is deformed when the terminal is inserted into the insertion hole. Accordingly, damage such as a tear is unlikely to occur. As described above, the low-temperature Charpy impact strength tends to reflect the probability of occurrence of damage caused by an impact applied when the terminal 20 comes into contact with the sealing member 10, whereas the loss tangent tan δ tends to reflect the probability of occurrence of damage caused by the sealing member 10 being deformed by the terminal 20. Thus, the smaller the loss tangent tan δ, the more likely the occurrence of damage caused by the deformation of the sealing member 10 is suppressed. Accordingly, by selecting, as the constituent material of the sealing member 10, a silicone rubber that has a low-temperature Charpy impact strength greater than or equal to a predetermined lower limit and a loss tangent tan δ less than or equal to the above-described upper limit, it is possible to suppress damage to the sealing member 10 caused by insertion of the terminal 20 to a higher degree, and easily ensure a high water sealability.

From the viewpoint of suppressing damage, the smaller the loss tangent tan δ of the silicone rubber, the more preferable. There is no particular limitation on the lower limit. Also, as will be shown in Examples given later, the values of the storage elastic modulus E' and the loss elastic modulus E" themselves do not exhibit a clear correlation with the probability of occurrence of damage to the sealing member 10. Accordingly, from the viewpoint of suppressing damage, there is no particular limitation on the ranges of the storage elastic modulus E' and the loss elastic modulus E". However, from the viewpoint of easily reducing the loss tangent tan δ or the like, it is preferable to use a silicone rubber that has a storage elastic modulus E' of approximately 1.5 MPa or more and a loss elastic modulus E" of approximately 0.3 MPa or less at room temperature. It is more preferable to use a silicone rubber that has a storage elastic modulus E' and a loss elastic modulus E" within the above described ranges while having a loss tangent tan δ of 0.10 or less.

(Density and Size of Insertion Hole)

As described above, by specifying the properties of the silicone rubber used as the constituent material of the sealing member 10, the occurrence of damage such as a tear when the terminal 20 is inserted into an insertion hole 11 can be suppressed. The effect of suppressing damage obtained by specifying the properties of the constituent material is exhibited irrespective of the physical configuration of the insertion holes 11 such as the arrangement density and the size of the insertion holes 11 of the sealing member 10. However, when the insertion holes 11 have a physical configuration that is more susceptible to damage when the terminals are inserted into the insertion holes and is more likely to be affected by the damage, the effect of suppressing damage obtained by specifying the properties of the constituent material of the sealing member 10 becomes relatively large. Accordingly, it is preferable that the insertion holes 11 have the above-described physical configuration.

The volume of the silicone rubber provided in regions between adjacent insertion holes 11 decreases as the arrangement density of the insertion holes 11 of the sealing member 10 increases, and a large load is likely to be applied to the silicon rubber in these regions. Accordingly, damage is likely to occur in the sealing member 10 when the terminals are inserted into the insertion holes. Also, when the inner diameter of an insertion hole 11 is reduced relative to the size of a cross section of a terminal 20, the inner circumferential surface of the insertion hole 11 deforms significantly when the terminal 20 is inserted into the insertion hole 11, and thus damage is likely to occur in the sealing member 10. Accordingly, from the viewpoint of relatively increasing the effect of suppressing damage obtained by specifying the properties of the silicone rubber that constitutes the sealing member 10, it is preferable that the arrangement density of the insertion holes 11 is higher, and the inner diameter of the insertion holes 11 is smaller.

Specifically, the arrangement density of the insertion holes 11 can be expressed by hole area ratio r, and the hole area ratio r may be set to 0.1 or more, or 0.2 or more. Here, the hole area ratio r is evaluated as r=Sh/S0, where S0 represents the area of a plate surface (the front surface 12 or the rear surface 13) of the sealing member 10, and Sh represents the total area (opening area) of the insertion holes 11 in the plate surface of the sealing member 10. When the arrangement density of the insertion holes 11 is too high, it becomes difficult to avoid damage when the terminals 20 are inserted into the insertion holes 11, and thus the hole area ratio r may be set to 0.5 or less.

The inner diameter of an insertion hole 11 can be expressed by the ratio (D/L) of the smallest diameter D of the insertion hole 11 relative to the largest outer dimension L of the terminal 20, and the ratio D/L may be set to 0.35 or less. Here, the smallest diameter D of the insertion hole 11 refers to the diameter of the insertion hole 11 measured at a point where the diameter is smallest in a direction of the insertion axis A. The largest outer dimension L of the terminal 20 refers to a cross-sectional dimension of the terminal 20 measured at a point where the cross-sectional dimension is largest in the direction of the insertion axis A. In the embodiment shown in the diagram, the largest outer dimension L of the terminal 20 corresponds to the length of a diagonal line of a cross section of the rectangular tubular portion 22. Also, the smallest diameter D may be set to be smaller than the outer diameter of the electric wire 35 such that the inner circumferential surface of the insertion hole 11 can be brought into close contact with the surface of the electric wire 35 in a state in which the terminal 20 of the terminal-equipped electric wire 30 is passed through the insertion hole and the electric wire 35 of the terminal-equipped electric wire 30 is disposed in the insertion hole 11. When the inner diameter of the insertion hole 11 is too small, it is difficult to avoid damage when the terminal 20 is inserted into the insertion hole 11, and thus the ratio D/L is preferably set to 0.19 or more.

EXAMPLES

Hereinafter, examples will be given. Here, the properties of the silicone rubber that constitutes the sealing member and the relationship between the occurrence of damage when the terminal is inserted into the insertion hole and water sealability were investigated. It is to be noted that the present invention is not limited to the examples given below.

[Preparation of Sample]

Sealing members were produced by molding pieces of silicone rubber into 4 mm thick plate-like members with insertion holes. Specifically, as samples A1 and A2 and samples B1 to B4, sealing members were produced using different silicone rubbers. At this time, sealing members with shapes 1 to 4 in which the area of the plate surface of the plate-like member and the total area of insertion holes were different were produced using each of the silicone rubbers of the samples. Table 1 given below shows area S0 of a plate surface of a plate-like member, total area Sh of insertion holes, and hole area ratio r (=Sh/S0) for the sealing members with shapes 1 to 4. The smallest diameter D of an insertion hole was set to 1.42 mm

TABLE 1

| Number of poles | Area S0 of plate surface of plate-like member [$mm^2$] | Total area Sh of insertion holes [$mm^2$] | Hole area ratio r (Sh/S0) |
|---|---|---|---|
| Shape 1 | 138 | 18.84 | 0.14 |
| Shape 2 | 200 | 62.8 | 0.31 |
| Shape 3 | 660 | 79.99 | 0.12 |
| Shape 4 | 1474 | 338.15 | 0.23 |

Furthermore, as shown in FIG. 1, male terminals, each integrally including a tab-like electrical connection portion, a tubular portion, and a crimping portion, were prepared as terminals. A terminal end of each terminal was connected through crimping to an electric wire with the insulation coating of the leading end portion being stripped so as to obtain a terminal-equipped electric wire. The largest outer dimension L of the terminal was 4.5 mm, and the outer diameter of the electric wire was φ2.78 mm

[Evaluation Method]

The properties of the silicone rubbers of the sealing members prepared above were evaluated. Also, the occurrence of tears was evaluated by inserting terminal-equipped electric wires into the insertion holes of the sealing members, and the water sealability of the sealing members was evaluated using a leak test. The evaluations were performed at room temperature (23° C.), except for the measurement of low-temperature Charpy impact strength.

(Low-Temperature Charpy Impact Strength)

For each sample, the low-temperature Charpy impact strength of the silicone rubber used as the constituent material of the sealing member was measured. The measurement was performed at −60° C. in accordance with the unnotched Charpy impact test specified in JIS K7111-1: 2012. The nominal pendulum energy was set to 1.00 J.

(Viscoelasticity)

For each sample, the viscoelasticity of the silicone rubber used as the constituent material of the sealing member was evaluated. In the evaluation, the storage elastic modulus E' and the loss elastic modulus E" were measured using dynamic viscoelasticity measurement, and the loss tangent tan δ=E"/E' was determined. The measurement frequency was set to 1 Hz.

(Evaluation of Occurrence of Tears)

First, terminals were inserted into all insertion holes of the sealing member of each sample so as to pass therethrough. The terminals were removed from the insertion holes, and then the inner circumferential surfaces of the insertion holes were visually observed to determine whether or not tears occurred in the constituent material of the sealing member. At this time, two types of tears: "scratches" and "gouges" were determined according to the extent of tearing. Here, the term "scratch" refers to a state in which a linear tear was formed on the surface, but no material is removed. On the other hand, the term "gouge" refers to a state in which a portion of the material is missing at the tear portion. Each sealing member was checked for tears in 60 insertion holes, and the number of insertion holes with scratches and the number of insertion holes with cracks were counted and recorded as the ratios (unit: %) relative to the total number of insertion holes (60 insertion holes). Here, "cracks" cause a reduction in the water sealability of the sealing member, but with "scratches" alone, the water sealability of the sealing member was hardly affected.

(Water Sealability)

Furthermore, a waterproof connector was produced using a new tear-free sealing member. Specifically, as shown in FIG. 1, the sealing member was housed in a housing and pressed against the rear wall. Furthermore, terminal-equipped electric wires were inserted into the insertion holes of the sealing member. At this time, the terminals were passed through the insertion holes such that the electric wires were disposed in the insertion holes. The waterproof connector in this state was attached to a hose-equipped sealing cover, and thereby a test sample was obtained. Next, the waterproof connector portion of the test sample was immersed in water, and air was introduced at a pressure of 200 kPa from the other end of the hose. While air was being introduced, the waterproof connector immersed in water was visually observed to determine whether air bubbles were released from an area between the sealing member and each terminal-equipped electric wire. When no air bubbles were observed, an A rating indicating a high water sealability was given to the test sample. When air bubbles were observed, a B rating indicating a low water sealability was given to the test sample. Separately from this, whether no air bubbles were released from between the housing and the sealing member and between the sealing cover and the waterproof connector was checked.

[Evaluation Result]

Table 2 given below shows the measured values of the low-temperature Charpy impact strength and the viscoelasticity of the silicone rubber of each sample, together with the results of evaluation of the occurrence of tears and the water sealability of each of the sealing members with shapes 1 to 4.

TABLE 2

| | | | Sample A1 | Sample A2 | Sample B1 | Sample B2 | Sample B3 | Sample B4 |
|---|---|---|---|---|---|---|---|---|
| Properties of silicone rubber | Low-temperature Charpy impact strength [$kJ/m^2$] | | 11.7 | 16.8 | 11.2 | 11.0 | 10.4 | 9.5 |
| | Viscoelasticity | Storage elastic modulus E' [MPa] | 1.9 | 3.2 | 1.6 | 2.7 | 3.4 | 2.9 |

TABLE 2-continued

| | | | Sample A1 | Sample A2 | Sample B1 | Sample B2 | Sample B3 | Sample B4 |
|---|---|---|---|---|---|---|---|---|
| | | Loss elastic modulus E" [MPa] | 0.08 | 0.26 | 0.18 | 0.33 | 0.44 | 0.40 |
| | | Loss tangent tanδ [—] | 0.042 | 0.081 | 0.113 | 0.122 | 0.129 | 0.138 |
| Evaluation result | Occurrence of tears (ratio relative to 60 insertion holes [%]) | Shape 1 | Scratches: 0 Cracks: 0 | Scratches: 0 Cracks: 0 | Scratches: 27 Cracks: 0 | Scratches: 24 Cracks: 5 | Scratches: 100 Cracks: 13 | Scratches: 100 Cracks: 16 |
| | | Shape 2 | Scratches: 0 Cracks: 0 | Scratches: 0 Cracks: 0 | Scratches: 32 Cracks: 0 | Scratches: 34 Cracks: 5 | Scratches: 100 Cracks: 16 | Scratches: 100 Cracks: 20 |
| | | Shape 3 | Scratches: 0 Cracks: 0 | Scratches: 10 Cracks: 0 | Scratches: 37 Cracks: 5 | Scratches: 40 Cracks: 9 | Scratches: 100 Cracks: 31 | Scratches: 100 Cracks: 46 |
| | | Shape 4 | Scratches: 0 Cracks: 0 | Scratches: 15 Cracks: 0 | Scratches: 44 Cracks: 5 | Scratches: 45 Cracks: 13 | Scratches: 100 Cracks: 46 | Scratches: 100 Cracks: 50 |
| | Water sealability | Shape 1 | A | A | A | B | B | B |
| | | Shape 2 | A | A | A | B | B | B |
| | | Shape 3 | A | A | B | B | B | B |
| | | Shape 4 | A | A | B | B | B | B |

From the results shown in Table 2, with respect to samples A1 and A2 made of silicone rubber with a low-temperature Charpy impact strength of 11.5 kJ/m$^2$ or more, it can be seen from the evaluation of the occurrence of tears that no cracks were formed, and it can also be seen from the evaluation of the water sealability that samples A1 and A2 have a high water sealability (A rating). On the other hand, with respect to samples B1 to B4 made of silicone rubber with a low-temperature Charpy impact strength of less than 11.5 kJ/m$^2$, it can be seen that, in each sample, cracks were observed in at least one of the sealing members with shapes 1 to 4. Furthermore, the ratio of occurrence of scratches was as high as 25% or more in all of the sealing members with shapes 1 to 4. Also, in at least one of the sealing members with shapes 1 to 4, a low water sealability was observed in the evaluation of the water sealability (B rating). From the results, it can be seen that the low-temperature Charpy impact strength of the silicone rubber is correlated with the probability of occurrence of damage when the terminals are inserted into the insertion holes of the sealing member and the water sealability of the sealing member, and, by setting the low-temperature Charpy impact strength to 11.5 kJ/m$^2$ or more, in the sealing member, damage caused when the terminals are inserted into the insertion holes can be effectively suppressed, and a high water sealability can be ensured.

Furthermore, in both sample A1 and sample A2, the low-temperature Charpy impact strength was set to 11.5 kJ/m$^2$ or more, but the value of the loss tangent tan δ was different between sample A1 and sample A2. With respect to sample A2 in which the loss tangent tan δ was large, in the evaluation of the occurrence of tears, no cracks were observed in all of the sealing members with shapes 1 to 4, but scratches were observed in at least one of the sealing members with shapes 1 to 4. As described above, with "scratches" alone, the water sealability of the sealing member is hardly affected under normal usage conditions. However, taking severe usage conditions into consideration, it is preferable that no scratches are formed. On the other hand, with respect to sample A1 in which the loss tangent tan δ was small, not only no cracks but also no scratches were formed in all of the sealing members with shapes 1 to 4, from which it can be seen that the occurrence of damage is more effectively suppressed. This fact indicates that it is possible to produce a sealing member in which damage that occurs when the terminals are inserted into the insertion holes can be particularly effectively suppressed by selecting a material with a loss tangent tan δ as low as possible using the loss tangent tan δ in addition to the low-temperature Charpy impact strength as indicators. The storage elastic modulus E' and the loss elastic modulus E" do not have a clear correlation with the results of evaluation of the occurrence of tears and the water sealability of the sealing member. Accordingly, the storage elastic modulus E' and the loss elastic modulus E" are unlikely to be good indicators from the viewpoint of suppressing damage that occurs when the terminals are inserted into the insertion holes.

Up to here, the embodiment of the present disclosure has been described in detail. However, the present invention is not limited to the embodiment given above, and various modifications can be made without departing from the gist of the present invention.

LIST OF REFERENCE NUMERALS

1 Waterproof connector
10 Sealing member
11 Insertion hole
12 Front surface
13 Rear surface
20 (Connector) Terminal
21 Electrical connection portion
22 Tubular portion
23 Crimping portion
30 Terminal-equipped electric wire
35 Electric wire
40 (Connector) Housing
41 Side wall
42 Rear wall
43 Opening
44 Window
A Insertion axis

What is claimed is:

1. A sealing member comprising:
a silicone rubber that is formed as a plate-like member; and
an insertion hole that is formed in a plate surface of the plate-like member and into which a connector terminal is capable of being inserted,
wherein the silicone rubber has an unnotched Charpy impact strength at −60° C. of 11.5 kJ/m$^2$ or more.

2. The sealing member according to claim 1,
wherein the silicone rubber has a loss tangent tan δ at room temperature of 0.10 or less.

3. The sealing member according to claim 1,
wherein the insertion hole comprises a plurality of insertion holes.

4. The sealing member according to claim 1, wherein a hole area ratio r that is evaluated as r=Sh/S0 is 0.2 or more, where S0 represents an area of the plate surface of the plate-like member, and Sh represents a total area of the insertion hole in the plate surface of the plate-like member.

5. A waterproof connector comprising:

the sealing member according to claim 1; and the connector terminal, wherein the connector terminal is inserted into the insertion hole of the sealing member.

6. The waterproof connector according to claim 5, wherein the connector terminal is connected to a terminal end of an electric wire, and an inner circumferential surface of the insertion hole of the sealing member is in contact with a surface of the electric wire.

* * * * *